Nov. 1, 1955  W. H. ESSELMAN ET AL  2,722,647
MOTOR CONTROL SYSTEM
Filed Oct. 27, 1950  2 Sheets-Sheet 1

WITNESSES:
Edward Michaels
Wm. C. Groome

INVENTORS
Walter H. Esselman &
Alvin O. Lund.
BY
ATTORNEY

United States Patent Office 2,722,647
Patented Nov. 1, 1955

2,722,647
MOTOR CONTROL SYSTEM

Walter H. Esselman, Pittsburgh, Pa., and Alvin O. Lund, East Orange, N. J., assignors to Westinghouse Electric Corporation, East Pittsburgh, Pa., a corporation of Pennsylvania Application October 27, 1950, Serial No. 192,542

5 Claims. (Cl. 318—326)

The invention relates to electric motor control systems, and, more particularly, to a speed responsive control for an electric motor for elevators, such, for example, as elevators of the general type shown in Eames Patent 2,363,302.

Speed control for elevator motors has always presented a problem, particularly in the case of alternating current motors, and many control systems have been proposed to take care of varied and specific operating conditions. In an elevator system, for example, it is quite common for the hoisting motor to be a single-speed induction motor, and speed control of the motor, particularly during the retardation and levelling operations, is a problem because a controlled slow speed is required in bringing the elevator car level with the floor. The levelling operation, for example, requires a movement of the car through a matter of inches, or even less than one inch, above or below the floor, so quite obviously full energization of the motor is impracticable. Some control of the motor may be effected by controlling the motor brake application, or by the use of a tachometer generator driven by the motor shaft. The present system is believed to have advantages over these expedients for some applications.

It is an object of the invention, therefore, to provide a controller for an alternating-current motor which provides for an energization thereof to bring it up to a desired maximum speed and to limit that speed.

A further object of the invention is to provide an improved controller for an elevator motor which will properly regulate the motor speed, particularly during the leveling operation of the elevator.

Another object of the invention is to provide a control device for an alternating-current motor which will produce a control voltage relatively constant in magnitude but at a frequency depending upon the speed of the motor, and then when the motor has attained a desired maximum speed, relatively abruptly discontinuing the control voltage to limit such speed.

Other objects of the invention will be apparent from the following description and the accompanying drawings in which.

Figure 1:
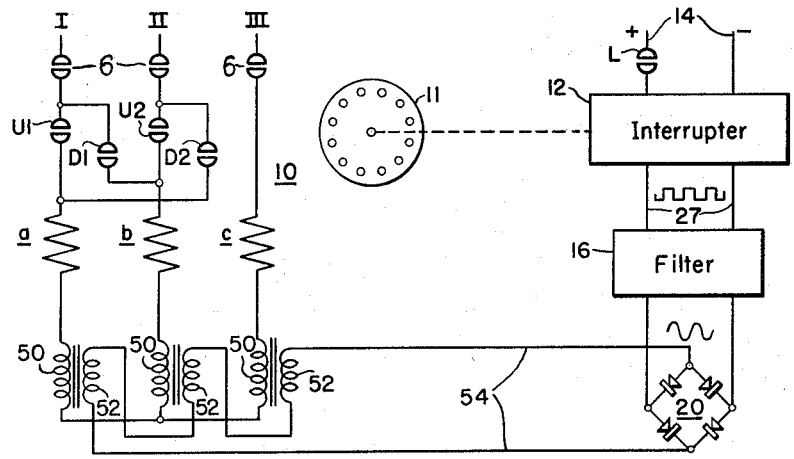
Figure 1 is a general schematic diagram of a control system embodying the invention.

Referring to Fig. 1, a motor 10 to be controlled is indicated as a three-phase alternating current motor, which may be of the squirrel-cage induction type, and comprises a rotor 11 and three stator windings $a$, $b$ and $c$.

In general, a circuit interrupting or commutating device 12 has a direct-current input from a suitable source 14, and produces an alternating current of substantially square-wave form. The interrupting device, to be described in more detail later, is suitably driven by the armature 11 of motor 10, as indicated by the dotted line, to operate at a speed the same as or proportional to that of the motor so that the output frequency varies with the motor speed.

The output of the device 12 is fed to a low-pass filter 16, to be described, which is so arranged that current frequencies only below a predetermined value may pass through it, and those above that value will be cut off or blocked.

The output of the filter 16 will be an alternating current generally of substantially sine-wave form depending on the speed of the interrupter 12, or the frequency of the filter input. That is, as the frequency approaches zero the filter output approaches the square-wave form of its input voltage, and at zero frequency the filter output is direct current, as will appear from the more detailed description of the interrupter and filter circuits. The filter output is fed to a full-wave rectifier, which may be a bridge of copper-oxide rectifiers, as indicated.

The direct-current output of the rectifier bridge is then available for controlling the motor 10, as will appear hereinafter.

Figure 2:
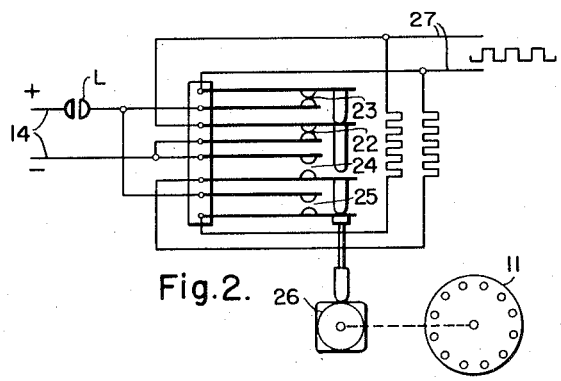
Fig. 2 is a schematic diagram of a circuit interrupting device which may be employed in the system shown in Fig. 1.

The interrupting device 12 may be of a type shown in Fig. 2, in which direct current from the source 14 is converted into alternating current of square-wave form by alternating the connections to the positive and negative sides of the source 14. This may be accomplished by "break" contacts 22 and 23, and "make" contacts 24 and 25, all of which are operated by a cam 26 rotated by the motor 10 or at a speed proportional to the speed of motor 10. Contact pile-ups of the character shown are quite common.

With the contacts in the position shown, the positive and negative sides of source 14 are respectively connected to the output circuit 27 through the contacts 23 and 22. Upon rotation of the cam, however, the connections will be reversed by the closure of contacts 24 and 25 thereby reversing the insantaneous polarity of the output circuit 27.

The contacts are of the make-before-break type, that is contacts 24 and 25 are adjusted to close before contacts 22 and 23 open, and, on the next operation, contacts 22 and 23 will reclose before contacts 24 and 25 reopen.

The resistors in circuit with contacts 24 and 25 serve as commutating resistances and limit the current during the period when both sets of contacts are closed. Also, it will be noted that if the motor is stopped with both sets of contacts closed, there will be available a control potential for the motor.

Figure 3:
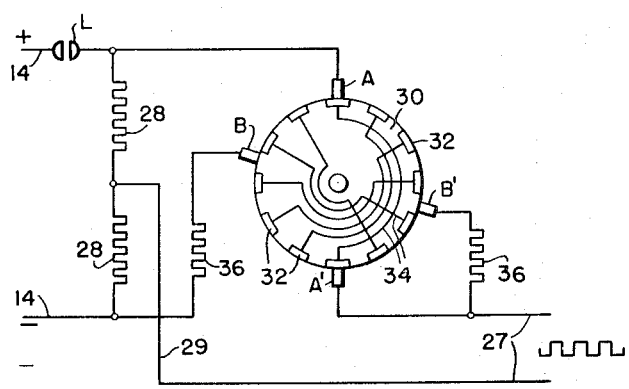
Fig. 3 is a schematic diagram of a control device which is an alternate to that shown in Fig. 2.

Although the arrangement shown in Fig. 2 is acceptable, the device of Fig. 3 is preferred for many applications. In that figure, a pair of resistors 28 of equal value are connected in series across the direct-current source 14, and a conductor 29 is connected between them to, in effect, center-tap the source 14. Conductor 29 constitutes one side of the alternating-current output circuit 27.

A rotatable commutator device 30 may be directly connected to the shaft of motor 10 to be driven thereby, or at least driven at a speed proportional to the motor speed. The commutator includes a plurality of contact segments 32, disposed around the edge of the rotor, and diametrically opposite segments are electrically connected by jumpers 34. Brushes A, A' and B, B' are provided for cooperating with the contact segments, the arrangement being generally such that the positive and negative sides of the source 14 will be alternately connected to the other side of the output circuit, and an alternating current of substantially square-wave form results. It will be noted that the brushes A and B are connected respectively to the positive and negative sides of the direct-current supply 14, and brushes A' and B' are connected to one side of the output circuit, the other side of the output circuit being fed from the midpoint of two resistors 28, as above noted.

The brush arrangement is such that when the brushes A and A' are centered on their respective segments, the brushes B and B' will be on dead spaces between adjacent segments, and the reverse is true when the brushes B and B' are centered on their respective segments. Preferably the brushes are smaller in width than the segments, and smaller than the width of the spaces between segments, but the arrangement is such that brushes B and B' will make contact with their respective segments just before the brushes A and A' break contact with their segments.

Resistors 36 are provided in the circuits of the B and B' brushes as commutating resistances to limit the short circuit current during the period when all of the brushes are in contact with segments. The connection is made in this manner so that there will always be an output potential for control purposes, even though the elevator motor may come to rest with both sets of brushes making contact. The resistors 36 are preferably of relatively low value compared to the load resistance so that the symmetry of the square wave is not substantially affected.

Figure 6:
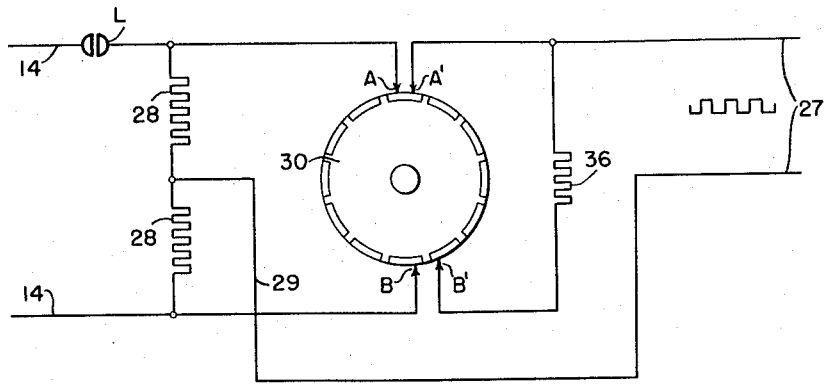
Fig. 6 is a schematic showing of a control device representing a modification of the device of Fig. 3.

An alternative to the commutating device of Fig. 3 is shown in Fig. 6. Using the same reference characters for corresponding parts, the commutator may be of more conventional construction in which the width of the insulation or dead space between bars is not so critical. The brushes A, A', corresponding to those of Fig. 3, are spaced to engage one of the commutator circuits to momentarily close one side of the alternating current circuit, while at the same moment the brushes B, B' are engaging adjacent segments which, of course, are insulated from each other. As the commutator rotates, brushes B, B' will both engage a common segment, and in view of a slightly greater spacing between them, as compared to brushes A, A', the circuit is closed from the negative side of the source 14 before the circuit from the positive side is broken by the electrical separation of brushes A, A'.

Figure 4:
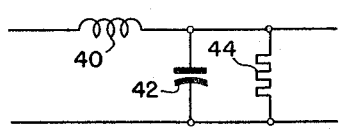
Fig. 4 is a schematic diagram, by way of example only, of a filtering circuit which may be used in the general system indicated in Fig. 1.
Figure 5:
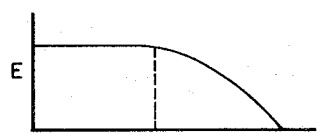
Fig. 5 is a curve indicating the character of the output of the filter circuit.

The low-pass filter 16 may be any of a number of types of network, a relatively simple circuit being shown in Fig. 4 by way of example, comprising an inductance 40, a capacitor 42 and a resistor 44 of such values that the circuit will pass current of frequencies up to about 40 cycles per second and will cut off relatively abruptly at that point. By way of example, the inductance 40 may have a value of 40 henries and the capacitor 42 may have a value of 1.6 mfd. The resistor 44 with a value of about 5,000 ohms will give the characteristics desired. In Fig. 5, a curve of the performance of the filter is indicated showing a substantially constant magnitude of voltage up to the frequency point Fc, at which point the voltage drops rapidly to zero. Of course, for different types of control requirements, the filter cut-off point may vary, or a plurality of cut-off points may be desired; such considerations require various filter combinations which are readily available.

The rectifier circuit 18 may be a conventional bridge arrangement of copper-oxide rectifiers which will give full-wave rectification to the output of the filter 16. The output of the rectifier will, of course, be direct current and is fed to the controller circuit for the motor 10.

By way of example, the controller may be as shown in Fig. 1. The three stator windings $a$, $b$, and $c$ of the motor 10 are energized from a suitable alternating current source indicated by line conductors I, II and III. A contactor or relay having contacts 6, which usually is energized when the elevator is in operation, may be used to connect the stator windings, source, and contacts U1, U2 or D1, D2 are closed depending upon the desired direction of rotation of the motor rotor as determined by the elevator operator; all in a conventional manner.

Saturable iron core reactors 50 having primary windings respectively connected in series with the stator windings $a$, $b$ and $c$ of the motor 10, and each is provided with a control winding 52. The control windings 52 are connected in series-circuit relation in a circuit 54 energized from the direct current output of the rectifier bridge 20.

It will be noted in Figs. 1, 2 and 3 that the direct-current source is controlled by contacts L which are normally open during operation of the elevator but will be closed during the leveling operation, which is the period during which the control of the speed of motor 10 is critical. The contacts L may be operated in any of several ways and it is not believed that a detailed description of the control thereof is necessary. However, by way of example, reference may be made to said Eames Patent 2,363,302, showing a levelling relay L which conditions the control circuits of an elevator to effect the levelling of the car when a stop is made.

Assuming that contacts L are closed and the motor 10 is ready to perform the leveling operation, the output of the interrupter 12 will at first be relatively high at a fairly low frequency which will pass through the filter 16 so that the control currents through the secondary windings 52 of the reactors will be relatively high, resulting in a low reactor impedance. Accordingly, the motor 10 will increase in speed and as the speed increases the frequency of the output of the interrupter 12 will increase to the point Fc in Fig. 5, whereupon the current through the filter 16 will drop off rapidly decreasing the current through the control windings 52. This will result in a substantial increase in the impedance in the reactors and a decrease in the energization of the motor 10.

The control circuit as a whole, therefore, is effective as a speed-limiting device to ensure a proper maximum speed of the motor 10 during the levelling operation. It is recognized, of course, that the direct current output of the rectifier 20 may not be sufficient to properly energize the control windings of conventional saturable reactors, in which event an electronic or other type amplifier may be used. The arrangement of Fig. 1 is schematic and illustrative only.

Figure 7:
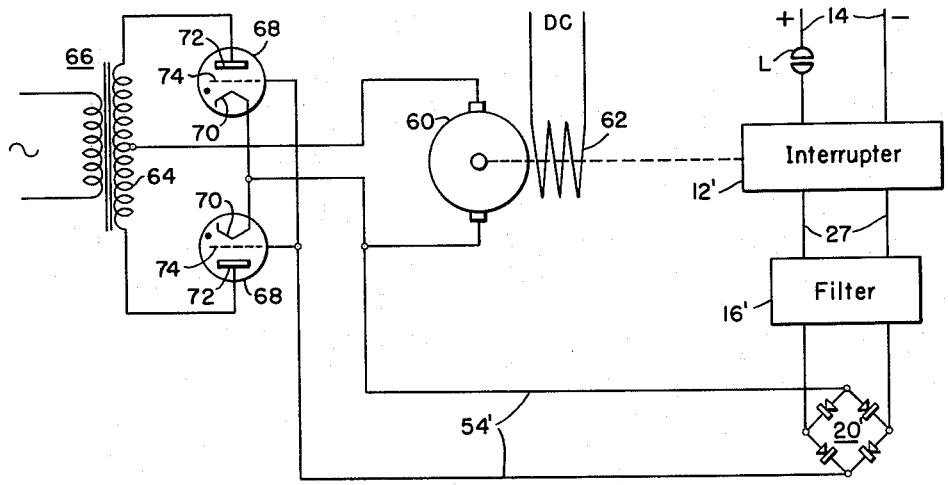
Fig. 7 is a schematic showing of an application of the invention to a direct current motor.

Another type of control scheme is shown in Fig. 7 in which the motor to be controlled comprises an armature 60 having a direct-current separately-energized field winding 62, the armature being energized by rectified alternating current from the secondary winding 64 of transformer 66. Full-wave rectification is accomplished by a pair of gas-filled electronic tubes 68 each having a cathode 70, an anode or plate 72, and a control electrode or grid 74. The direct current potential output of the rectifier bridge 20', derived as described in connection with the system of Fig. 1, is impressed through circuit 54' on the grids 74 of the tubes 68 to control the plate current thereof, and accordingly the energization of the motor armature 60. That is, the interrupter 12' may be any of the devices of Figs. 2, 3 or 6 producing an alternating current at a frequency proportional to the speed of the motor armature 60. The low-pass filter 16' will then cut-off at a predetermined frequency, limiting the rectified potential available for biasing the grids 74 of the tubes 68. As the grid bias drops, of course, the current through the tubes decreases to slow the motor armature to a desired value.

Although the control schemes of Figs. 1 and 7 have been described in connection with a levelling operation of an elevator, they are applicable to other elevator control operations, such as obtaining a desired landing speed.

or for obtaining a desired regulation at several speeds if necessary by simply changing the constants of the filter circuit.

Modifications of the control circuit disclosed, as well as the components thereof, will present themselves in the light of the foregoing description, and it is intended that the invention be limited only by the spirit and scope of the disclosure.

We claim as our invention:

1. In a control system for an electric motor, a source of direct-current, means for converting said direct current to an alternating current having a frequency proportional to the speed of said motor, an electroresponsive device for controlling the energization of said motor, and means for energizing said device in accordance with said alternating current only at frequencies below a predetermined value.

2. In a control system for an electric motor, a source of direct-current means for converting said direct current to an alternating current having a frequency proportional to the speed of said motor and of substantially square-wave form, an electroresponsive device for controlling the energization of said motor, and means for energizing said device in accordance with said alternating current only at frequencies below a predetermined value.

3. In a control system for an electric motor, a source of direct current, means for converting said direct current to an alternating current having a frequency proportional to the speed of said motor, a winding for controlling the energization of said motor, and means for energizing said winding in accordance with said alternating current only at frequencies below a predetermined value comprising a filtering circuit for passing current at frequencies only below such value.

4. In a control system for an alternating-current electric motor, means for regulating the speed thereof including a control winding, means for producing an alternating voltage having a frequency proportional to the speed of said motor and including means providing a direct current voltage at zero speed of said motor, and circuit connections between said last-named means and said winding including means for preventing alternating currents of higher than a predetermined frequency from affecting the energization of said winding.

5. In a control system for an alternating-current electric motor, means for regulating the speed thereof including a control winding, means for producing an alternating voltage having a frequency proportional to the speed of said motor, and of substantially constant magnitude, and circuit connections between said last-named means and said winding including means for preventing alternating currents of higher than a predetermined frequency from affecting the energization of said winding, said circuit connections including means for supplying to the control winding an energization which is substantially uniform for a substantial range of variation of the frequency of said voltage below said predetermined frequency.

References Cited in the file of this patent

UNITED STATES PATENTS

| | | |
|---|---|---|
| 1,183,881 | Koppitz | May 23, 1916 |
| 1,488,902 | Schaffer | Mar. 20, 1923 |
| 1,662,084 | Stroller et al. | Mar. 13, 1928 |
| 1,989,233 | Hutchinson | Feb. 15, 1932 |
| 2,021,753 | Suits | Nov. 19, 1935 |
| 2,331,960 | Button | Oct. 19, 1943 |
| 2,462,751 | Koehler | Feb. 22, 1949 |
| 2,555,491 | Hoover | June 5, 1951 |
| 2,589,277 | Noodleman | Mar. 18, 1952 |
| 2,610,315 | McKendry et al. | Sept. 9, 1952 |